United States Patent
Watanabe et al.

(10) Patent No.: US 6,291,535 B1
(45) Date of Patent: Sep. 18, 2001

(54) SILICA-MAGNESIUM FLUORIDE HYDRATE COMPOSITE SOLS AND PROCESS FOR THEIR PREPARATION

(75) Inventors: Yoshitane Watanabe, Funabashi; Keitaro Suzuki, Sodegaura; Osamu Tanegashima; Yoshinari Koyama, both of Funabashi, all of (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/455,928

(22) Filed: Dec. 7, 1999

(30) Foreign Application Priority Data

Dec. 9, 1998 (JP) .................................................. 10-349807

(51) Int. Cl.$^7$ .......................... B01F 3/12; C01B 33/146; C09D 1/00; C09K 3/00
(52) U.S. Cl. .................. 516/34; 106/286.6; 106/287.34; 516/79; 516/84
(58) Field of Search .................................. 516/79, 84, 34; 106/286.6, 287.34

(56) References Cited

U.S. PATENT DOCUMENTS

| 3,948,799 | * | 4/1976 | Schaefer et al. ............ 106/287.34 X |
| 4,054,536 | * | 10/1977 | Schaefer et al. ............ 106/287.34 X |
| 4,693,916 | * | 9/1987 | Nagayama et al. ................ 516/79 X |
| 5,019,293 | * | 5/1991 | Burlitch .................................. 516/79 |
| 5,221,497 | * | 6/1993 | Watanabe et al. .................. 516/84 X |
| 5,458,812 | * | 10/1995 | Brekau et al. ............. 106/287.34 X |
| 5,552,083 |   | 9/1996 | Watanabe et al. . |
| 5,667,725 |   | 9/1997 | Watanabe et al. . |
| 5,891,565 |   | 4/1999 | Watanabe et al. . |

FOREIGN PATENT DOCUMENTS

| 0 416 119 | 3/1991 | (EP) . |
| 0 585 819 | 3/1994 | (EP) . |
| 0 641 739 | 3/1995 | (EP) . |
| 64-41149 | 2/1989 | (JP) . |
| 2-26824 | 1/1990 | (JP) . |
| 7-69620 | 3/1995 | (JP) . |
| 7-69621 | 3/1995 | (JP) . |
| 8-122501 | 5/1996 | (JP) . |

OTHER PUBLICATIONS

A.A. Rywark, et al., Chemistry of Materials, vol. 8, No. 1, "SOL–GEL Synthesis of Nanocrystalline Magneium Fluoride: Its Use in the Preparation of Mgf$_2$ Films and MgF$_s$–SiO$_2$ Composites," Jan. 1996.
Patent Abstracts of Japan, vol. 016, No. 058 (P–1311), Feb. 13, 1992, JP 03 256002, Nov. 14, 1991.

* cited by examiner

*Primary Examiner*—Richard D. Lovering
(74) *Attorney, Agent, or Firm*—Oblon, Spivak, McClelland, Maier & Neustadt, P.C.

(57) ABSTRACT

A sol comprising silica-magnesium fluoride hydrate composite colloidal particles used in an anti-reflection coating material for forming an anti-reflection coating and a process for its preparation are provided. A sol comprising silica-magnesium fluoride hydrate composite colloidal particles having a ratio of silica to magnesium fluoride hydrate MgF$_2$.nH$_2$O, n being in the range between 0.25 and 0.5, in terms of a SiO$_2$/MgF$_2$ weight ratio of from 0.01 to 5 and a primary particle size of 5 to 50 nm. A process for the preparation of an aqueous sol comprising silica-magnesium fluoride hydrate composite colloidal particles which comprises the steps of adding an aqueous fluoride solution to a mixture liquid of a silica sol and an aqueous magnesium salt solution to produce a slurry of an agglomerate comprising silica-magnesium fluoride hydrate composite colloidal particles and removing the salts formed as by-products. A process for the preparation of an organosol further comprising the step of replacing water in the aqueous sol with an organic solvent.

5 Claims, No Drawings

SILICA-MAGNESIUM FLUORIDE HYDRATE COMPOSITE SOLS AND PROCESS FOR THEIR PREPARATION

FIELD OF THE INVENTION

The present invention relates to sols comprising silica-magnesium fluoride hydrate composite colloidal particles which are suitably used in anti-reflection coating materials for forming anti-reflection coatings onto substrates such as lenses, transparent plastics, plastic films, and display surfaces of cathode ray tubes, liquid crystal display devices as well as a process for their preparation.

PRIOR ARTS

In general, lenses, transparent plastics, plastic films, and display surfaces of cathode ray tubes, liquid crystal display devices are subjected to anti-reflection treatments in order to reduce reflection of external lights such as a sunlight and a lamplight and increase their optical transmittance. The anti-reflection treatment is effected by a vacuum deposition method or a coating method. A substance having a low refractive index such as magnesium fluoride or silica is used in an outermost layer of a coating.

Especially, it has been known that a magnesium fluoride sol and a silica sol are effective as microfillers for anti-reflection coating materials.

Reports concerning the magnesium fluoride sols are set forth below.

JP 64041149A proposes prevention of reflection by coating a screen panel of a cathode ray tube with a sol liquid comprising fine particles of magnesium fluoride having a particle size of 100 to 200 Angstroms. However, it does not describe a process for the preparation of the sol liquid.

JP 2026824A proposes aqueous and orcano magnesium fluoride sols, each having an optical transmittance of 50% or more, a coated product obtained by coating a substrate surface with the sol and drying, and a process for the preparation of the aqueous magnesium fluoride sol comprising the steps of simultaneously adding and reacting an aqueous magnesium salt solution and an aqueous fluoride solution to produce a gel-like precipitates, heating and aging the resultant reaction liquid and then removing an electrolyte remaining in the liquid. It describes that magnesium fluoride colloid particles obtained by the above process have very small particle size ranging from 100 to 120 Angstroms. While, it describes that a sol obtained by adding an aqueous potassium fluoride solution to an aqueous magnesium chloride solution has a colloidal particle size of 100 to 300 Angstroms, an opaque milky color and an optical transmittance of 20% or lower.

JP 7069621A describes a magnesium fluoride hydrate sol and a process for its preparation. And, it describes that the sol is used in an anti-reflection coating material.

Many other silica sols have also beer. proposed. For example, JP 8122501A describes an anti-reflection coating of a low refractive index comprising a silica sol having a particle size of 5 to 30 nm and a hydrolysate of alkoxysilane.

However, a silica-magnesium fluoride composite sol has not been reported.

Problems to be Solved by the Invention

Since the above-mentioned magnesium fluoride and magnesium fluoride hydrate colloidal particles themselves are inferior in bond strength, they should be combined with organic or inorganic binders to provide an anti-reflection coating material. The magnesium fluoride and magnesium fluoride hydrate sols have low refractive indexes, but they are weakly bound to binders so that a coating prepared therefrom does not have sufficient bond strength. On the other hand, the silica sol has sufficient bond strength, but its refractive index is not low. A coating prepared from the silica sol together with an organic binder does not have a low refractive index although it has high bond strength.

A sol having both a low refractive index inherent in magnesium fluoride and a bonding property inherent in silica sol and a process for easily preparing the same are desired.

An object of the present invention is to provide a novel silica-magnesium fluoride hydrate composite sol used in an anti-reflection coating for reducing reflection of an external light and increasing an optical transmittance as well as a process for easily preparing the sol.

[Method for Solving Problems]

The present invention relates to a sol comprising silica-magnesium fluoride hydrate composite colloidal particles having a primary particle size of 5 to 50 nm and a ratio of silica to magnesium fluoride hydrate $MgF_2 \cdot nH_2O$, n being in the range between 0.25 to 0.5, in terms of a $SiO_2/MgF_2$ weight ratio of from 0.01 to 5.

A process for the preparation of an aqueous sol comprising silica-magnesium fluoride hydrate composite colloidal particles of the present invention comprises the following steps (a) and (b):

(a) adding an aqueous fluoride solution to a mixture liquid of a silica sol having a primary particle size of 3 to 20 nm and an aqueous magnesium salt solution such that a F/Mg molar ratio ranges from 1.9 to 2.1 to produce a slurry of an agglomerate comprising silica-magnesium fluoride hydrate composite colloidal particles; and (b) removing the salts thus-formed as by-products from the slurry of the agglomerate comprising silica-magnesium fluoride hydrate composite colloidal particles obtained from the step (a).

And, a process for the preparation of an organosol comprising silica-magnesium fluoride hydrate composite colloidal particles of the present invention comprises the above steps (a) and (b) and the following step (c): (c) replacing water in the aqueous sol comprising silica-magnesium fluoride hydrate composite colloidal particles obtained from the step (b) with an organic solvent.

DETAILED DESCRIPTION OF THE INVENTION

A silica sol having a primary particle size of 3 to 20 nm used in the present invention can be prepared by any one of the known methods including a method using water glass as a starting material such as ion-exchanging, heating, spherizing and concentrating and a method of hydrolyzing ethyl or methyl silicate. It is also commercially available. Primary particle size is determined by the BET method, the Shears method or the electron-microscopic method. The above silica sol has generally a pH of 2 to 10, but any other sol can be used.

Magnesium salt used in the present invention is a water-soluble salt, including magnesium chloride, magnesium nitrate, magnesium sulfate, magnesium sulfamate, magnesium acetate, magnesium formate. The magnesium salt may be used alone or in combination. It may be used in the form of a normal salt or an acid salt.

Fluoride used in the present invention is a water soluble salt, including sodium fluoride, potassium fluoride, cesium fluoride, rubidium fluoride, ammonium fluoride, guanidine fluoride, quaternary ammonium fluoride, acidic ammonium fluoride, hydrogen fluoride. The fluoride may be used alone or in combination.

In the preparation of the silica-magnesium fluoride hydrate composite sol of the present invention, it is important that an aqueous fluoride solution should be added to a mixture liquid of a silica sol having a primary particle size of 3 to 20 nm and an aqueous magnesium salt solution with a mixing ratio in terms of a F/Mg molar ratio of from 1.9 to 2.1.

Simultaneous addition of an aqueous fluoride solution and a mixture liquid of a silica sol and an aqueous magnesium salt solution in such stoichiometric amounts of the magnesium salt and the fluoride as to produce magnesium fluoride and addition of a mixture liquid of a silica sol and an aqueous magnesium salt solution to an aqueous fluoride solution are not efficient processes for preparing a desired silica-magnesium fluoride hydrate sol.

The addition and mixing of the aqueous fluoride solution into the mixture liquid of the silica sol and the aqueous magnesium salt solution in the step (a) of the process of the present invention can be carried out with stirring using an apparatus such as a Satake type impeller, a Pfaudler type impeller, a disper and a homogenizer at the temperature of 0 to 100° C. for 0.1 to 10 hours.

Preferably, a concentration of the silica-magnesium fluoride hydrate composite colloid resulting from the step (a) is adjusted within the range between 0.1 and 10% by weight.

In the step (a), silica colloidal particles having a primary particle size of 3 to 20 nm and magnesium fluoride hydrate composite colloidal particles having a primary particle size of 5 to 20 nm are agglomerated to produce a sol-like slurry. When this slurry is allowed to stand, the agglomerates comprising silica-magnesium fluoride hydrate composite colloidal particles are settled and separated. The agglomeration of the colloidal particles is due to high concentrations of the salts formed as by-products from the step (a).

In the step (b) of the process of the present invention, the salts are removed from the slurry of the agglomerate comprising silica-magnesium fluoride hydrate composite colloidal particles from the step (a).

Methods to be used for removal of salts include a filtering-and-washing method using a membrane such as an ultrafiltration membrane or a reverse osmosis membrane, an ion-exchange method, a statically separating method. The most preferable method is a filtering-and-washing method using an ultrafiltration membrane. If necessary, the filtering-and-washing method using a membrane can be combined with other methods. In particular, the salts can be effectively removed by using a tubular ultrafiltration membrane. The ultrafiltration is generally carried out at the temperature ranging from 0 to 80° C., which can be varied depending on a material forming a membrane. It should be carried out by continuously or intermittently pouring water in order to achieve satisfactory removal of the salts, A filtration time is not particularly limited, but it is generally from 1 to 50 hours.

By removing the salts formed as by-products by the ultrafiltration or any other method, the agglomerate comprising silica-magnesium fluoride hydrate composite colloidal particles becomes smaller, whererby a sol comprising silica-magnesium fluoride hydrate composite colloidal particles can be obtained.

The sol comprising silica-magnesium fluoride hydrate composite colloidal particles from the step (b) has a primary particle size of 5 to 50 nm as observed under an electron microscope. This primary particle size corresponds to a diameter of one silica-magnesium fluoride hydrate composite colloidal particle, not a particle size of an agglomerate comprising silica-magnesium fluoride hydrate composite colloidal particles. It can be determined under an electron microscope.

After the ultrafiltration, the sol may be subjected to a cation exchange in order to improve its transparency.

The silica-magnesium fluoride hydrate composite sol from the step (b) has a $SiO_2/MgF_2$ weight ratio of from 0.01 to 5 and contains 2 to 20% by weigh of a silica-magnesium fluoride hydrate composite colloid.

In the step (c) of the process of the present invention, water in the aqueous sol comprising silica-magnesium fluoride hydrate composite colloidal particles is replaced with an organic solvent under reduced or atomospheric pressure according to any conventional method to obtain an organosol. Examples of organic solvents include methanol, ethanol, isopropanol, n-propanol, DMF, DMAC, ethylene glycol or propyl CELLOSOLVE. The organic solvent may be used alone or in combination.

Further, the organosol may be subjected to treatment with a silane coupling agent followed by solvent-replacement with organic solvent such as ketones (e.g. methyl ethyl ketone), ethyl acetate, toluene to obtain an organosol.

When the silica-magnesium fluoride hydrate composite sol obtained by the present process was dried at 110° C. to give a powder, which was subjected to a differential thermal analysis and an X-ray diffraction analysis. The powder was identified with $MgF_2 \cdot nH_2O$, n being in the range between 0.25 and 0.5.

And, the composite sol of the present invention had a F/Mg molar ratio of 2.0.

As clear from the above, the composite sol of the present invention was shown to be a composite sol comprising silica and magnesium fluoride hydrate.

Since a mixture liquid of a silica sol and an aqueous magnesium salt solution is alkaline and therefore has poor stability, it is preferable to adjust a pH of the mixture liquid within the range between 3 and 6 by using an acidic silica sol having a pH of 2 to 5 or using a magnesium salt or a fluoride as an acid salt, or optionally adding an acid.

A concentration of the mixture liquid will be varied depending on a primary particle size of a silica sol to be used, but it should be controlled such that a silica gel is not produced.

A primary particle size of a silica sol to be used is preferably in the range between 3 and 20 nm. The primary particle size of less than 3 nm is not preferable since the silica sol is easily gelled and a stability of the resultant silica-magnesium fluoride hydrate composite sol becomes worse. On the other hand, the primary particle size of above 20 nm is not preferable since transparency of the silica-magnesium fluoride hydrate composite sol becomes worse and such properties (refractive index and bonding property) as observed in the composite colloid are not obtained. Most preferably, the silica sol has a primary particle size of 4 to 8 nm.

In the step (a) of the process of the present invention, a reaction of a mixture liquid of a silica sol and an aqueous magnesium salt solution with an aqueous fluoride solution is carried out such that a ratio of fluorine to magnesium in terms of a F/Mg molar ratio is in the range between 1.9 and 2.1. The molar ratio of less than 1.9 is possible, but it is not efficient since a larger amount of a magnesium salt remains unreacted. And, the molar ratio of above 2.1 is not preferable since more free fluoride ions remains in a slurry comprising silica-magnesium fluoride hydrate composite colloidal particles produced in the step (a). Especially in case where the slurry has a lower pH, the colloidal silica in the composite sol is reacted with the free fluorine ions to produce silicohydrofluoric acid during the washing in the step (b), whereby a large amount of silica becomes soluble.

In the step (a) of the process of the present invention, preferably, a pH after mixing a mixture liquid of a silica sol and an aqueous magnesium salt solution with an aqueous fluoride solution is in the range between 3 and 6. The pH of less than 3 is not preferable since a colloidal silica is reacted with a fluoride ion to produce silicohydrofluoric acid during the washing in the step (b), whereby a large amount of silica dissolves into the slurry. On the other hand, the pH of above 6 is not preferable since remarkable agglomeration of silica prevents producing a sol having which transparency even after desalting treatment. More preferably, the pH is in the range between 3 and 5.

A temperature in the step (a) is from 0 to 100° C. The temperature of above 100° C. is not preferable since a dehydration reaction proceeds.

A time in the step (a) is from 0.1 to 10 hours. The time of less than 0.1 hour is not preferable since mixing is not sufficient. And, the time of above 10 hours is possible, though it is not preferable since a preparation time is further prolonged.

In the step (a) of the process of the present invention, $Mg^{++}$ is adsorbed or bound to a silanol group of a colloidal silica particle. Thus, when magnesium fluoride hydrate colloidal particles are formed, silica-magnesium fluoride hydrate composite colloidal particles are produced by combination of silica colloidal particles with magnesium fluoride hydrate colloidal particles, or by formation of magnesium fluoride hydrate on surfaces of silica particles. In addition, the colloidal silica acts as a dispersing agent to prevent the growth of particles of magresium fluoride hydrate, giving fine colloidal particles. The resultant silica-magnesium fluoride hydrate composite colloidal particles are not divided into silica particles and magnesium fluoride hydrate particles even if they are subjected to removal of salts in the step (b) and solvent replacement in the step (c).

Preferably, a mixing ratio of silica to magnesium fluoride hydrate in terms of a $SiO_2/MgF_2$ weight ratio in the step (a) is from 0.01 to 5.0, especially from 0.05 to 2.

A concentration of the silica-magnesium fluoride hydrate composite colloid in the step (a) is in the range between 0.1 and 10% by weight in terms of $SiO_2+MgF_2$. The concentration of less than 0.1% by weight is possible, but it is not effective. And, the concentration of above 10% by weight is also possible, but it is not preferable since the reaction unevenly occurs. Most preferably, the concentration is in the range between 0.5 and 5.0% by weight.

A temperature in the step (b) is from 0 to 80° C. Higher temperature is effective since a filtration speed becomes faster. With the increase in temperature, dehydration reaction proceeds. Thus, the temperature ranging from room temperature to 60° C. is preferable.

A time in the step (b) is from 1 to 50 hours. The time of above 50 hours is possible, but it is riot preferable since a preparation time is further prolonged.

Water used for washing in the step (b) may be pure water. If necessary, a pH of a washing liquid is preferably adjusted within the range between 3 and 6 by adding an acid such as hydrochloric acid.

A pH of the aqueous sol comprising silica-magnesium fluoride hydrate composite colloidal particles from the step (b) is preferably in the range between 3 and 6.

A temperature for solvent replacement. in the step (c) is varied depending on a boiling temperature of a solvent used. Preferably, the solvent replacement is carried out at the temperature as low as possible under reduced pressure such that a dehydration of magnesium fluoride hydrate does not proceed during the solvent replacement.

Concentrations of the aqueous sol comprising silica-magnesium fluoride hydrate composite colloidal particles from the step (b) and the organosol comprising silica-magnesium fluoride hydrate composite colloidal particles from the step (c) are in the range between 2 and 20% by weight. The concentration of less than 2% by weight is possible, but it is not preferable since when mixed with a binder on use, the concentration is further lowered. And, the concentration of above 20% by weight is also possible, but it is not preferable since the sol is hardly handled due to its high viscosity.

In the aqueous sol obtained from the step (b) or the organosol obtained from the step (c), silica-magnesium fluoride hydrate composite colloidal particles are present as discrete particles or in the form of fine agglomerated particles. The sol containing the particles shows high transparency as such. If the fine agglomerated particles become larger, they may be mechanically divided into discrete composite particles or more fine agglomerated composite particles by means of a disper, a homogenizer, an ultrasonic homogenizer or the like in order to improve transparency of the sol.

A primary particle size of the silica-magnesium fluoride hydrate composite colloidal particle of the present invention is in the range between 5 and 50 nm as observed under an electron microscope. The primary particle size of above 50 nm is not preferable since transparency of an anti-reflection coating becomes poor. And, the primary particle size of the silica-magnesium fluoride hydrate composite colloidal particle generally becomes larger with the increase of the reaction temperature in the step (a).

Since the silica-magnesium fluoride hydrate composite colloid of the present invention has a low refractive index and high transparency, a good anti-reflective effect can be obtained by using a sol comprising the silica-magnesium fluoride hydrate composite colloidal particles.

EXAMPLES

Example 1 step (a):

To 358 g (37.9 g in terms of $SiO_2$) of a silica sol having a primary particle size of 5.0 nm (Shears method) (trade name "SNOWTEX OXS" manufactured by Nissan Chemical industries Ltd.; specific gravity=1.060; viscosity=1.2 mpa.s; pH=2.8; $SiO_2$=10.6 wt %), 3000 g of pure water was added to prepare 3358 g of a silica sol containing 1.13% by weight of silica.

246 g (115.2 g, 1.21 mole in terms of $MgCl_2$) of magnesium chloride ($MgCl_2 \cdot 6H_2O$; guaranteed reagent grade; manufactured by KOSO Chemical) was dissolved in 2214 g of pure water to prepare 2460 g of an aqueous solution containing 4.68% by weight (in terms Of $MgCl_2$) of magnesium chloride.

After 69.0 g of acidic ammonium fluoride ($NH_4F \cdot HF$; guaranteed reagent grade; manufactured by MORITA KAGAKU) was dissolved in 2093 g of pure water, 73.5 g of 28% aqueous ammonia (reagent grade; manufacture by KOSO Chemical) was added to prepare 2236 g (89.6 g, 2.42 moles in terms of $NH_4F$) of an aqueous solution containing 4.01% by weight of ammonium fluoride.

3375 g of the above silica sol was charged into a vessel of 10 L capacity, to which 2460 g of the above aqueous magnesium chloride solution and 125 g of an aqueous solution containing 10% by weight of hydrochloric acid were successively added with vigorous stirring by means of a disper. After stirring 10 minutes, 2236 g of the above aqueous ammonium fluoride solution was added over 15 minutes with stirring and then the stirring was continued for one hour. Thus, 8179 g of slurry comprising silica-magnesium fluoride hydrate composite colloidal particles was obtained.

The slurry had a pH of 3.75, a conductivity of 35 mS/cm, a silica ($SiO_2$) concentration of 0.463% by weight, a concentration of magnesium fluoride hydrate of 0.922% by weight in terms of $MgF_2$ (75.4 g in terms of $MgF_2$) and a concentration of silica-magnesium fluoride hydrate composite colloid in terms of $SiO_2+MgF_2$ of 1.385% by weight. A ratio of silica to magnesium fluoride hydrate in terms of a $SiO_2/MgF_2$ weight ratio was 0.50. A ratio of fluorine to magnesium in terms of a F/Mg molar ratio was 2.0.

The resultant slurry showed a transparent colloidal color similar to that of a sol, but it tended to be settled and separated when allowed to stand.

step (b):

8179 g of the slurry comprising silica-magnesium fluoride hydrate composite colloidal particles from the step (a) was filtered and washed in an ultrafiltration apparatus of flat membrane type (Pericon cassette system; manufactured by Millipore Corp.) with a UF membrane having a fractional molecular weight of 100,000 (membrane area=0.46 m²) (manufactured by Millipore Corp.) while intermittently pouring 32 kg of pure water. Since a pH of a liquid was increased by filter washing, 13 g of an aqueous 10% hydrochloric acid solution was added portionwise in the middle of the filtering-and-washing stage in order to adjust the pH of the slurry to 4 to 5. A liquid temperature was 25° C. and a filtering-and-washing time was 26 hours. After the filtering-and-washing, the resultant filtrate was directly concentrated in the same ultrafiltration apparatus to obtain 1200 g of an aqueous sol comprising silica-magnesium fluoride hydrate composite colloidal particles. The resultant sol had a pH of 4.45, a conductivity of 570 μS/cm and a concentration of a silica-magnesium fluoride hydrate composite colloid in terms of $SiO_2+MgF_2$ of 7.84% by weight. A fluorescent X-ray elemental analysis demonstrated that a ratio of silica to magnesium fluoride hydrate in terms of a $SiO_2/MgF_2$ weight ratio was 0.40. Yield was 83%. The silica-magnesium fluoride hydrate composite colloidal particles had a primary particle size of 10 to 15 nm as observed under an electron microscope. This sol was stable even after being allowed to stand at room temperature for 2 months or more.

The resultant aqueous sol was dried at 110° C. to give a powder, which was subjected to a powder X-ray diffraction analysis. The powder X-ray diffraction pattern corresponded to that of magnesium fluoride hydrate $MgF_2 \cdot nH_2O$, n being in the range between 0.25 and 0.5. Silica component did not appear in the above diffraction pattern because it was amorphous. The result of the differential thermal analysis did not show any remarkable endothermic peak. It was confirmed that a product obtained by drying the aqueous sol was a hydrate since a weight loss at the temperature ranging from 100 to 300° C. was about 10%.

step (c):

To 670 g (52.5 g in terms of $SiO_2+MgF_2$) of the aqueous sol comprising silica-magnesium fluoride hydrate composite colloidal particles obtained from the step (b), about 18 liters of methanol was continuously charged in a rotary evaporator at a liquid temperature of 20 to 30° C. under reduced pressure so that water contained therein was replaced with methanol, thereby 426 g of a methanol sol comprising silica-magnesium fluoride hydrate composite colloidal particles was obtained. The resultant methanol sol comprising silica-magnesium fluoride hydrate composite colloidal particles had a specific gravity of 0.861, a pH of 7.20 when diluted with water in 1:1, a viscosity of 1.6 mPa.s, a concentration (in terms of $SiO_2+MgF_2$) of 12.3% by weight, a water content of 0.26% by weight, a transmittance of 69.4% and a particle size of 137 nm as determined by the dynamic light scattering method (determined in N4 manufactured by Cortar).

Predetermined amounts of a liquid containing a hydrolysate of a silane coupling agent and the above methanol sol were mixed, by which a coating was formed on a silicon wafer. According to the calculation using a refractive index of this coating, a refractive index of the silica-magnesium fluoride hydrate composite colloid was 1.39.

The resultant sol was stable and did not increase a viscosity or gelling even after being allowed to stand at room temperature for 3 months or more.

Example 2 step (a):

To 188 g (19.9 g in terms of $SiO_2$) of a silica sol having a primary particle size of 5.0 nm (Shears method) (trade name "Snowtex OXS" manufactured by Nissan Chemical Industries Ltd.; specific gravity=1.060; viscosity=1.2 mPa.s; pH=2.8; $SiO_2$=10.6 wt %), 3000 g of pure water was added to prepare 3188 g of a silica sol containing 0.624% by weight of silica.

246 g (115.2 g, 1.21 mole in terms of $MgCl_2$) of magnesium chloride ($MgCl_2 \cdot 6H_2O$; guaranteed reagent grade; manufactured by KOSO Chemical) was dissolved in 2214 g of pure water to prepare 2460 g of an aqueous solution containing 4.68% by weight (in terms of $MgCl_2$) of magnesium chloride.

After 71.4 g of acidic ammonium fluoride ($NH_4F \cdot HF$; guaranteed reagent grade; manufactured by MORITA KAGAKU) was dissolved in 2200 g of pure water, 72.1 g of 28% aqueous ammonia (reagent grade; manufacture by KOSO Chemical) was added to prepare 2344 g (92.7 g, 2.50 moles in terms of $NH_4F$) ($NH_4$/F molar ratio=0.974) of an aqueous solution containing 3.95% by weight of ammonium fluoride.

3188 g of the above silica sol was charged into a vessel of 10 L capacity, to which 2460 g of the above aqueous magnesium chloride solution was added with vigorous stirring by means of a disper. After stirring for 15 minutes, 2344 g of the above aqueous ammonium fluoride solution was added over 15 minutes with stirring and then the stirring was continued for 1.5 hours. Thus, 7992 g of a slurry comprising silica-magnesium fluoride hydrate composite colloidal particles was obtained.

The slurry had a pH of 4.37, a conductivity of 36.1 mS/cm, a silica ($SiO_2$) concentration of 0.249% by weight, a concentration of magnesium fluoride hydrate of 0.943% by weight in terms of $MgF_2$ (75.4 g in terms of $MgF_2$) and a concentration of silica-magnesium fluoride hydrate composite colloid of 1.192% by weight. A ratio of silica to magnesium fluoride hydrate in terms of a $SiO_2/MgF_2$ weight ratio was 0.264. A ratio of fluorine to magnesium in terms of a F/Mg molar ratio was 2.07.

Immediately after the formation of the slurry, the resultant slurry showed a transparent colloidal color similar to that of a sol, but it tended to be settled and separated after being allowed to stand overnight.

step (b):

After the slurry from the step (a) was allowed to stand for one day, 400 g of a separated supernatant (transparent) was removed, to which 500 g of pure water was added and stirred by means of a disper for 1 hour to obtain 8992 g of a slurry.

This slurry did not show a clear settling and separation even after being allowed to stand overnight. This slurry was subjected to filtering-and-washing in an ultrafiltration apparatus of flat membrane type (Pericon cassette system; manufactured by Millipore Corp.) with a UF membrane having a fractional molecular weight of 100,000 (membrane area= 0.46 m$^2$)(manufactured by Millipore Corp.) while intermittently pouring 15 kg of pure water. A liquid temperature was 25° C. and a filtering-and-washing time was 18 hours. After the filtering-and-washing, the resultant filtrate was directly concentrated in the same ultrafiltration apparatus to obtain 912 g of an aqueous sol comprising silica-magnesium fluoride hydrate composite colloidal particles. The resultant sol had a pH of 5.04, a conductivity of 820 $\mu$S/cm and a concentration of a silica-magnesium fluoride hydrate composite colloid in terms of $SiO_2+MgF_2$ of 7.42% by weight. A. fluorescent X-ray elemental analysis demonstrated that a ratio of silica to magnesium fluoride hydrate in terms of a $SiO_2/MgF_2$ weight ratio was 0.07. Yield was 71%. The silica-magnesium fluoride hydrate composite colloidal particles had a primary particle size of 10 to 15 nm as observed under an electron microscope. This sol was stable even after being allowed to stand at room temperature for 3 months or more.

The resultant aqueous sol was dried at 110° C. to give a powder, which was subjected to a powder X-ray diffraction analysis. The powder X-ray diffraction pattern corresponded to that of magnesium fluoride hydrate $MgF_2.nH_2O$ (n=0.25–0.5). Silica component did not appear in the above X-ray diffraction pattern because it was amorphous. The result of the differential thermal analysis did not show any remarkable endothermic peak. It was confirmed that a product obtained by drying the aqueous sol was a hydrate since a weight loss at the temperature ranging from 100 to 300° C. was about 10%.

step (c):

To 694 g (51.5 g in terms of $SiO_2+MgF_2$) of the aqueous sol comprising silica-magnesium fluoride hydrate composite colloidal particles obtained from the step (b), about 15 liters of methanol was continuously charged in a rotary evaporator at a liquid temperature between 20 and 30° C. under reduced pressure so that water contained therein was replaced with methanol, and thereby 373 g of a methanol sol comprising silica-magnesium fluoride hydrate composite colloidal particles was obtained. The resultant methanol sol comprising silica-magnesium fluoride hydrate composite colloidal particles had a specific gravity of 0.874. a pH of 4.76 when diluted with water in 1:1, a viscosity of 2.5 mPa.s, a concentration (in terms of $SiO_2+MgF_2$) of 13.8% by weight, a water content of 0.67% by weight, a transmittance of 84.2% and a particle size as determined by the dynamic light scattering method (determined in N4 manufactured by Cortar) of 115 nm.

Predetermined amounts of a liquid comprising a hydrolysate of a silane coupling agent and the above methanol sol were mixed, by which a coating was formed on a silicon wafer. According to the calculation using a refractive index of this coating, a refractive index of the silica-magnesium fluoride hydrate composite colloid was 1.33.

The resultant sol was stable without increasing a viscosity or gelling even after being allowed to stand at room temperature for 3 months or more.

Comparative Example 1 step (a):

A commercially available water glass was diluted with pure water to a silica concentration of 4.0% by weight, which was passed through a column filled with a cation exchange resin Amberlite 120 B to obtain 1042 g ($SiO_2$, 37.5 g) of an aqueous solution comprising an active silicic acid colloid having a silica concentration of 3.6% by weight. This aqueous solution comprising the active silicic acid colloid had a pH of 2.50 and a primary particle size of 2 nm or less. To 1042 g of the aqueous solution of the active silicic acid colloid, 2600 g of pure water was added to prepare 3642 g of an aqueous colloid solution having a silica concentration of 1.03% by weight.

246 g (115.2 g, 1.21 mole in terms of $MgCl_2$) of magnesium chloride ($MgCl_2.6H_2O$; guaranteed reagent grade; manufactured by KOSO Chemical) was dissolved in 2214 g of pure water to prepare 2460 g of an aqueous solution containing 4.68% by weight (in terms of $MgCl_2$) of magnesium chloride.

While, after 69.0 g of acidic ammonium fluoride ($NH_4F.HF$; guaranteed reagent grade; manufactured by MORITA KAGAKU) was dissolved in 2093 g of pure water, 73.5 g of 28% aqueous ammonia (reagent grade; manufacture by KOSO Chemical) was added to prepare 2236 g (89.6 g, 2.42 moles in terms of $NH_4F$) of an aqueous solution containing 4.01% by weight of ammonium fluoride.

3642 g of the above aqueous active silicic acid colloid solution was charged into a vessel of 10 L capacity, to which 2460 g of the above aqueous magnesium chloride solution and 125 g of an aqueous 10% hydrochloric acid solution were successively added with vigorous stirring by means of a disper. After stirring for 10 minutes, 2236 g of the above aqueous ammonium fluoride solution was added over 15 minutes with stirring and then the stirring was continued for 1 hour. Thus, 8463 g of a slurry comprising silica-magnesium fluoride hydrate composite colloidal particles was obtained.

The slurry had a pH of 3.91, a conductivity of 33.6 mS/cm, a silica ($SiO_2$) concentration of 0.443% by weight, a concentration of magnesium fluoride hydrate of 0.891% by weight in terms of $MgF_2$ (75.4 g in terms of $MgF_2$) and a concentration of silica-magnesium fluoride hydrate composite colloid of 1.334% by weight in terms of $SiO_2+MgF_2$. A ratio of silica to magnesium fluoride hydrate in terms of a $SiO_2/MgF_2$ weight ratio was 0.497. A ratio of fluorine to magnesium in terms of a F/Mg molar ratio was 2.0.

Immediately after the formation of the slurry, the slurry showed a transparent colloidal color similar to that of a sol, but a turbid state was observed in the slurry being allowed to stand for several hours. Clearly, the gelation of the slurry occurred.

step (b):

The slurry obtained from the step (a) was not dispersed into microgels by stirring, for example by means of a disper. Thus, an filtering-and-washing using a ultrafilter was impossible in the step (b). And, a cake was washed on Nusche funnel, but it was impossible to wash the cake since a large amount of a filtrate was not smoothly passed therethrough.

[Effect of the Invention]

The sol comprising silica-magnesium fluoride hydrate composite colloidal particles of the present invention is a sol comprising composite colloidal particles having both properties inherent in silica and properties inherent in magnesium fluoride hydrate. The sol comprising silica-magnesium fluoride hydrate composite colloidal particles with desired properties (low refractive index and high bond strength) cannot be obtained by merely mixing the known silica sol with the known magnesium fluoride hydrate sol. Such a sol comprising silica-magnesium fluoride hydrate composite colloidal particles with the above properties can be obtained only by the process comprising the steps (a) and (b) and the optional step (c).

Both the aqueous sol and the organosol of the present invention have a primary particle size of 5 to 50 nm as observed under an electron microscope and show good transparency and dispersibility. A dried product of the sol has a low refractive index as low as 1.3 to 1.4 and a dry coating has a good optical transmittance. Thus, a good anti-reflection coating can be formed onto substrates such as glass lenses, plastic lenses, glass plates, transparent plastic plates, transparent plastic films, display surfaces of cathode ray tubes and liquid crystal display, color filters by using this sol alone or by combining this sol with other binder such as a solution of an organic resin (e.g. methyl methacrylate) dissolved in an organic solvent, an emulsion of an organic resin (e.g. acrylic resin, acrylic styrene resin, polyester resin), an aqueous solution of a water soluble polymer (e.g. polyvinyl alcohol), a liquid of a partially hydrolyzed silane coupling agent, a liquid of a partially hydrolyzed ethyl silicate and the like.

What is claimed is:

1. A sol comprising silica-magnesium fluoride hydrate composite colloidal particles having a ratio of silica to magnesium fluoride hydrate $MgF_2 \cdot nH_2O$, n being in the range between 0.25 and 0.5, in terms of a $SiO_2/MgF_2$ weight ratio of from 0.01 to 5 and a primary particle size of 5 to 50 nm.

2. The sol according to claim 1, wherein the sol is an aqueous sol.

3. The sol according to claim 1, wherein the sol is an organosol.

4. A sol preparation process comprising (a) adding an aqueous fluoride solution to a mixture liquid of a silica sol having a primary particle size of 3 to 20 nm and an aqueous magnesium salt solution such that a F/Mg molar ratio is in the range between 1.9 and 2.1 to produce a slurry of an agglomerate, which comprises silica-magnesium fluoride hydrate composite colloidal particles, and salts formed as by-products; and (b) removing the salts formed as by-products from the slurry to form an aqueous sol.

5. The process according to claim 4, further comprising (c) replacing water in the aqueous sol with an organic solvent.

* * * * *